US010860979B2

(12) United States Patent
Geffen et al.

(10) Patent No.: US 10,860,979 B2
(45) Date of Patent: Dec. 8, 2020

(54) DEVICE, SYSTEM AND METHOD FOR SUMMARIZING AGREEMENTS (71) Applicant: NICE-SYSTEMS LTD., Ra'anana (IL)

(72) Inventors: David Geffen, Givat Shmuel (IL); Eshay Livne, Karkur (IL); Omer Abramovich, Kfar Saba (IL); Eyal Eshel, Burlington, MA (US)

(73) Assignee: NICE LTD., Ra'anana (IL)

( * ) Notice: Subject to any disclaimer, the term of this patent is extended or adjusted under 35 U.S.C. 154(b) by 1126 days.

(21) Appl. No.: 14/623,775

(22) Filed: Feb. 17, 2015

(65) Prior Publication Data
US 2016/0239805 A1    Aug. 18, 2016

(51) Int. Cl.
G06Q 10/10 (2012.01)
G10L 13/08 (2013.01)
G06F 3/16 (2006.01)

(52) U.S. Cl.
CPC ............ G06Q 10/10 (2013.01); G06F 3/167 (2013.01); G10L 13/08 (2013.01)

(58) Field of Classification Search
CPC .... G06Q 10/10; G06Q 30/0601; G06F 3/165; G06F 3/167; G10L 13/08
USPC ....... 705/342, 26, 26.1, 1.1, 304; 379/88.13, 379/88.14, 265.06, 265.09; 455/414.1
See application file for complete search history.

(56) References Cited

U.S. PATENT DOCUMENTS

| | | | |
|---|---|---|---|
| 4,429,372 A * | 1/1984 | Berry | G06F 17/211 707/999.004 |
| 4,510,619 A * | 4/1985 | LeBrun | G06K 17/00 235/432 |
| 6,356,634 B1 | 3/2002 | Noble | |
| 7,080,076 B1 * | 7/2006 | Williamson | G06F 17/24 |
| 7,640,510 B2 | 12/2009 | Sirstins et al. | |
| 8,036,347 B1 | 10/2011 | Kanade | |
| 8,041,565 B1 * | 10/2011 | Bhardwaj | G10L 15/28 704/235 |
| 8,160,233 B2 | 4/2012 | Keren et al. | |
| 8,438,494 B2 | 5/2013 | Sirstins et al. | |
| 8,468,027 B2 | 6/2013 | Dow | |
| 8,503,619 B2 | 8/2013 | Baker | |
| 8,537,983 B1 * | 9/2013 | Haggerty | H04M 11/00 379/265.06 |
| 8,619,951 B2 | 12/2013 | Johansen et al. | |

(Continued)

OTHER PUBLICATIONS

Chambers, Mark L. MacBook All-In-One for Dummies, 2nd Ed., 2011, p. 336.*

(Continued)

*Primary Examiner* — Minnah L Seoh
*Assistant Examiner* — Richard W. Crandall
(74) *Attorney, Agent, or Firm* — Pearl Cohen Zedek Latzer Baratz LLP (57) ABSTRACT A computerized system for summarizing agreements between two or more parties, comprises one or more processors. The processors may be configured to capture data relating to the agreement, such as agent screen data during an interaction with a customer. The data may be captured in successive capture operations each in response to an event, such as an agent key press or data entry. The captured data may be used to prepare a continuous text summarizing the agreement. An audio summary of the agreement may be derived from the text and played to at least one of the parties.

10 Claims, 9 Drawing Sheets (56) References Cited

U.S. PATENT DOCUMENTS

| | | | | |
|---|---|---|---|---|
| 9,462,238 B1* | 10/2016 | Barnes | ................ | H04N 9/29 |
| 2002/0095311 A1* | 7/2002 | Donahue | ................ | G06Q 10/10 |
| | | | | 705/80 |
| 2006/0095556 A1* | 5/2006 | Arnold | ............. | H04M 1/72522 |
| | | | | 709/223 |
| 2006/0184410 A1* | 8/2006 | Ramamurthy | ......... | G06Q 10/10 |
| | | | | 706/8 |
| 2008/0189099 A1* | 8/2008 | Friedman | .......... | G06F 17/30772 |
| | | | | 704/8 |
| 2009/0006369 A1* | 1/2009 | Guday | ............. | G06F 17/30719 |
| 2009/0254345 A1* | 10/2009 | Fleizach | ............... | G10L 13/043 |
| | | | | 704/260 |
| 2010/0268544 A1* | 10/2010 | Nitahara | ........... | G06F 17/30371 |
| | | | | 705/2 |
| 2010/0271944 A1* | 10/2010 | Michaelis | ............... | H04L 45/24 |
| | | | | 370/230.1 |
| 2011/0161085 A1* | 6/2011 | Boda | ....................... | G06Q 30/02 |
| | | | | 704/260 |
| 2011/0287748 A1* | 11/2011 | Angel | ............. | H04M 3/42221 |
| | | | | 455/414.1 |
| 2012/0323796 A1* | 12/2012 | Udani | .................... | G06Q 50/24 |
| | | | | 705/80 |
| 2016/0098578 A1* | 4/2016 | Hincker | .................. | G06F 21/64 |
| | | | | 726/26 |

OTHER PUBLICATIONS

Chambers, Mark L. MacBook All-In-One for Dummies, 2nd. Ed., 2011, p. 336 (Year: 2011)*

* cited by examiner

| Mortgage Application Recap |
|---|

| ? Mortgage Application Recap            <u>FB</u>   FairBank | ～701 |
|---|---|

Say: I will now play a 99 seconds automated script that will capture everything we discussed. Please stay with me on the line and through the end, or you may interrupt it for any questions. ～702

Play the following text:         Read it myself ☐ ～703

Mr. John Bart, just to recap:
 -We have you locked in on a 30 year fixed rate mortgage at Rate 3.75% /APR with 3 points.
-The closing costs for this transaction are $2570.
-Your new estimated monthly payment is $2,373.
-Estimated new loan amount is $854,386.
-Locking rate for 60 days, as it does take currently 8-10 weeks to close.
-Best number to reach you at as 999-555-1111.
-You will receive our loan package within the next few hours via email, 2 business days if paper out.
-Once you have logged in and are viewing the documents please print out and sign the Authorization to Disclose Information form, Property Interest Form, etc. and work on gathering other documents i.e. tax returns, asset statements, declaration page.
-To guarantee your interest rate lock I must have all documents SIGNED and RETURNED within 3 business days.
-We may request additional documents throughout the process as well. Please respond quickly, within 2 days, to those requests.
-I will be in touch with you weekly throughout the process to answer any questions and ensure we are delivering a great customer experience.

～704

<u>Remaining narration time: 99 seconds</u> ～705

Back   Next ～706

*FIGURE 7*

ⓘ Play Progress             [x]

Mr. John Bart, just to recap:

-We have you locked in on a 30 year fixed rate mortgage at Rate 3.75% /APR with 3 points.
-The closing costs for this transaction are $2570.
-Your new estimated monthly payment is $2,373.
-Estimated new loan amount is $854,385.
-Locking rate for 60 days, as it does take currently 8-10 weeks to close.
-Best number to reach you at as 999-555-1111.
-You will receive our loan package within the next few hours via email, 2 business days if paper out.
-Once you have logged in and are viewing the documents please print out and sign the Authorization to Disclose Information form, Property Interest Form, etc. and work on gathering other documents i.e. tax returns, asset statements, declaration page.
-To guarantee your interest rate lock I must have all documents SIGNED and RETURNED within 3 business days.
-We may request additional documents throughout the process as well. Please respond quickly, within 2 days, to those requests.
-I will be in touch with you weekly throughout the process to answer any questions and ensure we are delivering a great customer experience.
-Please be aware that you may need to make one payment for the closing.
-Once your loan is ready to close someone from FairBank will call you to schedule the closing.

If you don't have any further questions, I want to thank you for banking with FairBank.

FIGURE 8

| Mortgage Application Recap |
|---|
| ? Mortgage Application Recap      FB FairBank |

Say: I will now play a 99 seconds automated script that will capture everything we discussed. Please stay with me on the line and through the end, or you may interrupt it for any questions.

Play the following text:      Read it myself ☐

> Mr. John Bart, just to recap:
> -We have you locked in on a 30 year fixed rate mortgage at Rate 3.75% /APR with 3 points.
> -The closing costs for this transaction are $2570.
> -Your new estimated monthly payment is $2,373.
> -Estimated new loan amount is $854,386.
> -Locking rate for 60 days, as it does take currently 8-10 weeks to close.
> -Best number to reach you at as 999-555-1111.
> -You will receive our loan package within the next few hours via email, 2 business days if paper out.
> -Once you have logged in and are viewing the documents please print out and sign the Authorization to Disclose Information form, Property Interest Form, etc. and work on Remaining narration time: 0 seconds Confirmation: ○ No answer provided   ● Approve   ○ Decline Confirmation ID:   76Y8465T5R554 ———— 901
Mortgage Application: Accepted by customer ID
Recap:   462366544 via keypad press (5)
Date & Time:   28/07/2014 19:43:29

Back   Next — 903

DEVICE, SYSTEM AND METHOD FOR SUMMARIZING AGREEMENTS

FIELD OF THE INVENTION

Embodiments of the present invention relate to the field of automated capture of data for example during an oral conversation or interaction between two or more parties. Such an oral conversation or interaction may relate to an agreement being negotiated between the parties. Examples of agreements include but are not limited to agreements to transactions such as banking and financial transactions, which may include loans, purchase agreements using credit or debit cards and mortgages, service agreements for mobile communications, agreed policies that may be applied to insurance, and others.

BACKGROUND OF THE INVENTION

When agreements are made between parties, for example orally, at least one of the parties may be required to verify the terms of the agreement in order to ensure and be able to demonstrate that the agreement, or for example a transaction resulting from an agreement, is valid. For example companies that provide service are required to verify the terms of the service they provide with the customer in order to ensure that the transaction and details of the transaction are valid. This is particularly important in financial transactions and other agreements that are legally binding. Some specific non-limiting examples of agreements may include or relate to any one or more of the following:

Service agreements in telecommunications (e.g., relating to product purchased and/or monthly payment);
Insurance policies (e.g., insurance coverage, monthly payments);
Financial loans (e.g., loan terms, payment terms, interest rate)
Utilities services (Schedule of technician, types of maintenance, down-time).

When such agreements are concluded in a telephone or other oral conversation or interaction, it is typical for the details of the agreement as previously agreed to orally, to be read out by one party to the one or more others. Often a selling party will be represented by an agent, for example, working for a call center. After listening to the oral agreement read out aloud, the customer or other party or parties will signify confirmation of agreement, for example, by pressing a particular telephone key or orally by stating agreement. This may be followed by, for example, closing of a transaction or deal.

This verification procedure presents a number of challenges including but not limited to:

Time usage (~1-2 min) which ideally could be available for other tasks;
Customers may not understand agents due to regional accents or speed of delivery, a factor which is particularly relevant when call centers are located off shore from where the customers are located. This may have implications for customer satisfaction and/or present challenges in terms of compliance, e.g. with local or international legislation relating to the agreement.
Customer authorization is hard to capture (it may be necessary to search for the interaction and replay it). Furthermore, when a dispute occurs the entire interaction needs to be played back to find the relevant part being disputed—this may result in higher handling time and lower customer satisfaction.

SUMMARY OF EMBODIMENTS OF THE INVENTION

Embodiments of the invention provide methods and systems for summarizing agreements between two or more parties. Systems according to embodiments of the invention may include one or more processors configured to capture multiple events relating to the agreement. Each capture operation may be executed in response to a detected event. Each event may for example relate to a term or parameter of the agreement or the selection of a term or parameter of the agreement. The captured data may be used to prepare a continuous text summarizing the agreement. An audio summary of the agreement may be derived from the text and played to at least one of the parties.

According to embodiments of the invention, authorization by one of the parties may be captured and stored for example as metadata to the agreement. This metadata may be stored with or associated with the exact terms or parameters of the agreement that may have formed part of the audio summary, for example to be read to the customer.

Methods according to embodiments of the invention may be computer implemented and may comprise receiving data relating to an agreement, for example via a user interface. The agreement may be between two parties and the data may be derived from multiple events relating to the agreement. The multiple event data may be used to generate a continuous audio summary of the agreement. This audio summary may be presented to at least one of the parties, for example played to a party during a telephone call.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

The following are definitions of terms as used in this description and in the field to which the invention relates:

Embodiments of the invention are described herein for use in agreements, for example preceding transactions between vendors and customers. Vendors are often represented by agents at call centers. Thus a "user" of a system according to embodiments of the invention may be for example an agent of a call center and an "agent" as mentioned herein is one non-limiting example of a user. A "user" of a system according to embodiments of the invention may also be a customer. The term "customer" is used herein also to denote a potential customer to whom a call is made or an interaction with an agent is initiated. Other non-limiting examples of agents include call center representatives, employees and customer advocates.

"Business Customer" is used herein to denote a party on whose behalf a system or method is used according to embodiments of the invention. For example, the services of a call or interactions center may be outsourced by a business customer to a call center operator. In this scenario the agent may represent the business customer.

An interaction refers to any exchange between two or more parties and may take place at least partially by auditory information, such as, via the medium of speech (orally), which may be transmitted e.g. by telephone, email attachment or any other messaging service or through any other mechanism or medium. The at least partially auditory interaction may include both parties communicating by auditory means or one party communicating by auditory means (e.g., speaking) and the other party communicating non-auditory means (e.g., by pressing telephone keys, or communicating via textual means).

Verification by a party in the context of embodiments of the invention unless otherwise stated refers to a party confirming that the party has understood or accepted (or rejected) terms of an agreement. "Verification" may sometimes refer to "confirmation".

Components and processes according to some embodiments of the invention are described as being "real time". Thus for example embodiments of the invention may be used in the context of decision making during the course of an interaction. Systems and methods according to embodiments of the invention are not limited to real time components and processes.

"Summary" is used herein to refer to a statement of main points, and thus a summary of an agreement according to embodiments of the invention may be a statement of the main points of an agreement. Also a summary according to embodiments of the invention may be a statement of matters agreed during an interaction between parties. "Summarizing" is used herein to refer to the preparation or generation of a summary or the "summing up" of matters agreed during an interaction.

Systems and methods according to embodiments of the invention may be used to automate a procedure for verification of agreements, for example, agreements concluded in an interaction between an agent and a customer, with one or more the following features:

1. Capturing of relevant agreement, e.g., 'deal' or transaction, details. Some of the capturing may occur during interactions such as but not limited to telephone interactions, based for example on speech recognized dialogue, IVR responses, agent screen activity, and/or other data sources. Capturing agreement details may be done for example by defining events, for example, but not limited to desktop events, which trigger data or content capture from any of a variety of sources such as an agent screen or other data sources such as backend databases accessible for example via a backend server, web services and/or third party repositories. Non-limiting examples of other events which may trigger the capture of data include the identification of a customer or other individual or organization, e.g. for which data is already held. This identification may be referred to as "resolving" and may involve the matching of received data relating to a customer, such as, a caller or other person interacting with an agent or system, with stored data relating to that customer. The data may be input by the customer or the agent, for example, via a customer or agent screen or interactive voice response (IVR) system. When a match or likely match is detected, which may be done automatically or manually by the customer or agent, the matched stored/received data may be captured and used in an agreement being conducted. Such information may include for example CRM information (e.g. customer profile or status such as silver, gold, platinum), customer identification information such as an address or any information which may not be on the customer's screen but may be relevant to the agreement. Such information may reside in a repository, e.g. of an organisation, from which it may be retrieved. According to embodiments of the invention the captured data may be in the form of text. According to other embodiments at least some of the captured data may include non-textual data, such as, audio data or screenshots, which may be converted to text.

2. Captured data relating to the agreement may be stored, for example, in a buffer. This buffering may occur in response to successive capture operations, each in response to an event. When a time comes to verify a deal or agreement details (the actual time may depend on call type and may be automatically determined for example based on screen activity or determined based on an agent request), all relevant information, for example, the buffered data, may be sent to a text to speech (TTS) mechanism which converts the text to speech. This is referred to as "narration". The speech may be played back to the customer using customer audio equipment, for example, a telephone, headphones or speakers. This component of the interaction may be saved (for example as audio) whereby it may be played back at a later time. This playback may be achieved by having the captured text sent via an API to the text to speech server, which then streams the audio to the agent's extension.

3. A customer may confirm, or not confirm, the terms of the agreement, for example by approving or rejecting a transaction. This may be achieved by a customer using an IVR system, e.g., by a key press. The IVR confirmation, e.g. approval or rejection, may appear on an agent's screen notifying the agent that the customer agrees or disagrees, e.g. the customer has approved or rejected the transaction. Other methods of confirmation include the customer saying (vocally) that he/she agrees or disagrees, e.g. a transaction is approved or rejected. The customer's approval, if in spoken form, may be converted from speech to text for example via a speech recognition or speech to text (STT) system. Captured audio, converted text, and/or details or metadata related to the interaction and/or customer may be stored by the system. The approval or rejection may be attached to the interaction as metadata or otherwise stored so as to be associated with the interaction or agreement, e.g. transaction. Other methods of approval include the sending of the narration to the customer during the interaction via short message service (SMS), for example as an audio, e.g. .wav file attached to an SMS message, and the customer replying by SMS of approval of the terms of the agreement.

4. An indication of customer approval, optionally as well as the deal, agreement or transaction details, may be attached to stored interactions as searchable metadata. In addition, during the narration which is played back to the customer, the system may report e.g. to an agent, the progress of the 'read-out' to indicate whether or not and/or at which point (in time or text) the customer is listening to the narration. For example, the system may provide an agent display having a moveable indicator tracking a textual version of the audio in real time as the audio is being played to the customer.

Systems and methods according to some embodiments of the invention may have one or more of the following capabilities:

- Consolidation of screen activity (e.g., from one or multiple screen(s) of one or multiple parties) into a single script or text string;
- Manually activated or automatically activated, for example triggered by rules such as business rules, audio playback of an interaction summary, for example, summarizing agreements which may be required to confirm, e.g. concluded with or "signed off" by customers, to implement the agreement;
- Ability to pause/resume audio play-back, for example during a live call or interaction, for example by a customer or by the agent or both, which may be useful in the event of customer questions or for hearing impaired customers;
- The agent may 'remain' on the line with the customer while the audio is played, for example, such that no call transfer may be required;
- An agreement summary may be "read" by a high quality human synthesized voice and/or multiple different voices, for example, which may be selected according to the agent or customer profile;
- The summary may be read in a predefined legal compliant manner (legible, 'legal' speed, complete disclosure of text/s), for example, according to applicable legislation, rules or guidelines;
- For verification, the customer may confirm agreement/ understanding of a agreement summary or terms, for example, by clicking a button on the customer's device (e.g., cell phone or land line keypad), signing a digital signature, entering a passcode, pressing a finger against a biometric interface to submit a fingerprint, etc.
- A record of the interaction may be stored and customer confirmation may be attached to the interaction record as metadata which may be searchable, so that for example all "confirmed" or "verified" interactions may be searched, or depending on how the verification is recorded all "rejected" interactions may be searched.
- The text itself and/or the audio summary may also be stored so as to be associated with the interaction record or the verification or both.

According to embodiments of the invention, summarizing an agreement may take place in real-time, for example, during an interaction for confirming the agreement, as a streaming process. This is in contrast for example to a system or method, also possible according to embodiments of the invention, in which pre-stored scripts are read to a party in response to successive triggers as individual terms are agreed. Thus according to some embodiments of the invention, text e.g. text to be narrated, is not generated until after one or multiple capture operations in response to successive events concerning the agreement. After the agreement is defined, the text is then generated and converted to audio form. The audio is then sent to the customer device where it is "played" or reproduced so that the customer can hear it. This streamed process combines benefits of compliance with optimizing call handling time and customer experience.

The possibility according to embodiments of the invention of linking or associating verification to script, narration or interaction may provide a particularly useful benefit for example of being able to analyze agent performance or a proportion of agreements settled or transaction acceptance rates.

Figure 1:
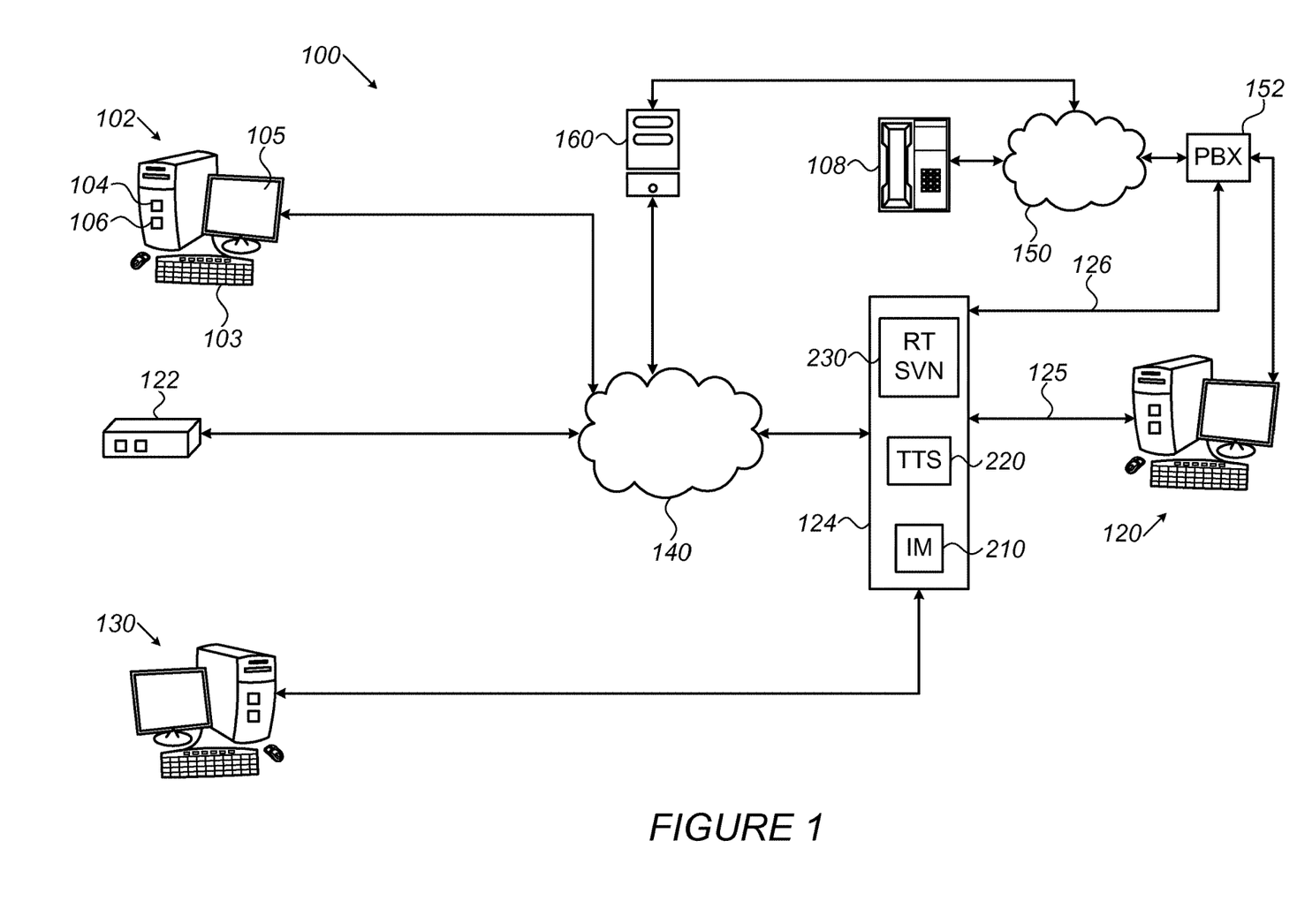
FIG. 1 schematically illustrates a system according to embodiments of the invention.

Reference is made to FIG. 1, which schematically illustrates a system 100 in accordance with an embodiment of the invention.

System 100 may include one or more customer computers 102 for interacting over the world wide web ("web") e.g. via the Internet or other network 140, one or more web servers 122 for hosting or distributing information over the web, e.g. via the Internet or other network 140. Server 122 may serve as a backend server for information e.g. data to be captured according to embodiments of the invention. System 100 may also include one or more other customer devices 108, such as telephone, SMS message or text enabled devices, for the customer to interact over another network, such as, a telephone or messaging network, such as a packet switched telephone network "PSTN" 150.

System 100 may also include one or more agent computers 120 and one or more designer computers 130, which may be constructed and function similarly to customer computer 102 which is described in more detail herein.

Customer computer 102, may include one or more input devices, for receiving input from a user, e.g. a keyboard 103, pointing device, click-wheel or mouse, touch screen, recorder/microphone, other input components, and output devices e.g., a monitor and/or display screen 105 for displaying data to a user and/or agent. Further, customer computer 102 may comprise one or more controllers or processors 106 for executing operations in accordance with embodiments of the invention and one or more memory units 104 for storing data and/or instructions (e.g., software) executable by the processor.

It will be appreciated that any of the computers described with reference to embodiments of the invention may take any form including but not limited to desktop personal computer, laptop, smartphone and tablet computing device.

System 100 further comprises interaction management center 124 described in more detail with reference to FIG. 2. Interaction management center 124 includes interaction management server 210, text to speech server 220 and real time and/or version server 230. System 100 further comprises conferencing server 160. In some embodiments, agent computer 120 may operate Internet protocol "IP" telephony capability and thus be configured to communicate with PSTN 150 e.g. via a private branch exchange "PBX" 152.

Agent computer 120 may communicate with interaction management center 124 in any way including via the Internet or any other network. In FIG. 1 agent computer 120 is shown connected to interaction management center 124 via link 125 which may be part of a proprietary call center network. PBX 152 may be connected to center 124 via link 126. PBX 152 and link 126 may also be part of a proprietary call center network.

The operation of components shown in FIG. 1 will now be described in more detail with reference to FIG. 2 which is a schematic diagram of computer architecture suitable for implementing some embodiments of the invention. The architecture is illustrated and described as a set of separate components for the sake of clarity but it will be appreciated that the functions of any of the components shown in FIG. 2 may be combined into fewer components or may be distributed across multiple components. For example the functions of any of the servers as described herein may be combined into one device or may be distributed across multiple devices and/or across multiple locations. Like components in FIGS. 1 and 2 are indicated with like reference numerals.

Figure 2:
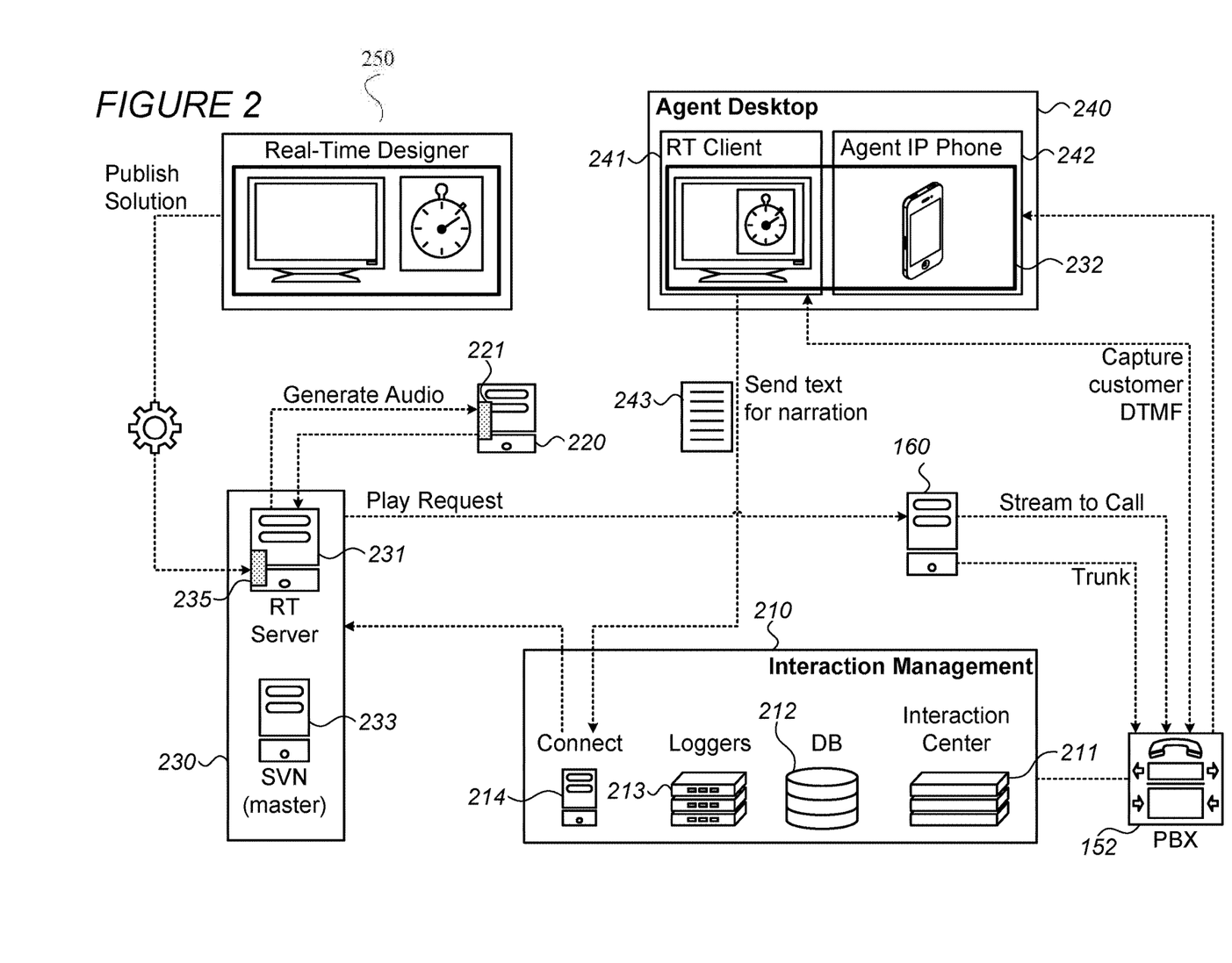
FIG. 2 is a schematic diagram of computer architecture suitable for implementing embodiments of the invention.

FIG. 2 shows an agent desktop 240 (e.g., agent computer 120 of FIG. 1) and designer desktop 250 (e.g., designer computer 130 of FIG. 1). Agent and designer desktops 240 and 250 are each able to communicate with interaction management center 124. Agent desktop may run a "real time client" 241 and an IP phone 242. Real time client 241 may include an interaction decision engine 232, which may comprise a software module forming part of the real time client 241.

Interaction management server 210 may include interaction center 211 which may be responsible for recording and maintaining rules, monitoring and scheduling telephone or web connections and/or populating a database 212, for example, with a record of each interaction in which an agent participates. These interactions may be formatted in a variety of media including but not limited to telephone and e-mail. Interactions management server 210 further comprises an insight to impact (ITI) connect server 214. Connect server may be a general-purpose server configured to manage communications between the real time and version server 230 and agent desktop 240. Interactions management server 210 further comprises loggers 213 e.g. respective loggers for logging interaction data such as audio/voice, screenshots or screen events, text and other data under the control of interaction center 211 for storage in database 212.

A call center or other interaction management center, such as interaction management server 210, may perform different tasks for different business users. For example a bank may require its call center facility to operate in a different manner from a product retailer but both may be served by the same call center. One purpose of the real time and version server 230 is to control how the interaction management center responds to the needs of its users. As shown, the real time and version server 230 comprises real time server 231, interaction decision engine 232, and version server 233.

According to embodiments of the invention, a designer application installed on designer computer 130 may enable the creation of base-level instructions by a designer for the interaction decision engine 232 so that it may specify detailed descriptions of how a variety of conditions should be responded to, for example what data should be captured, at what point should an agreement be regarded as complete to prompt or trigger the preparation of the text, and so on. According to embodiments of the invention, data relating to an agreement may be captured according to rules, and methods according to the invention may comprise receiving input defining one or more of the rules. These rules or conditions may depend on information extracted from connections to existing data sources, for example belonging to a business customer, such as fields and/or tables in a customer database and/or on the screens of customer service applications. An IT developer may create an automation solution or operating scheme with the designer which includes capturing screen images and/or text, creating guiding callouts and defining triggers, integrating text and point of narration using TTS server 220. Call-outs may include for example pop-ups which may appear on an agent's desktop during a call or other interaction. A pop-up may include text which the agent is advised to either read, e.g. "Tell the customer that the offer is good for 24 hours" or do e.g. "Click on the save button".

A solution, e.g. business customer specific operating scheme, may then be assigned and distributed to the chosen clients at interaction center 211 from the designer application at designer computer 130 via real time server 231.

Version server 233 is configured to perform version or subversion source control of developed solutions, e.g. business customer specific operating schemes. Thus version server 233 may perform subversion source control. This may be in the form of a source control solution or scheme which includes the developed solutions. Upon startup of a method or system according to embodiments of the invention, for example, on a desktop application at agent computer 120, the appropriate solution may be automatically downloaded and ready for operation.

Real time server 231 may perform a variety of functions including providing a server side component which exposes an application program interface (API) 235, e.g. to the designer application, for managing the data or traffic between the various components. According to embodiments of the invention, real time server 231 may serve to manage communication between the client/agent, e.g. agent real time client 241, to the TTS server 220 for the narration only. Interaction center 211 may then be responsible for recording the calls and maintaining them, for example using a recording platform, for playback and query.

Client software installed on agent computer 120, which may be referred to as a "real time client," may provide an interface, e.g. at agent desktop 240, for use by an agent during an interaction with a customer. This real time client may provide an interface that guides agents though the handling of customer interactions according to policies and directives of an organization or business. The real time client may be an application that runs transparently (out of sight) in the background on agent computer 120, for example, to provide guidance and assistance in the handling of the dynamics of customer interactions in real time. According to some embodiments of the invention, the real time client may automatically download from version server 233 the assigned solution or appropriate operating scheme devised by the developer for the agent and business customer. Once triggered, for example according to rules or conditions that were defined in the solution by the designer operating the designer application, the guidance will start. For example a business rule on desktop activity may sense the need for an agreement summary and trigger the generation thereof. At a defined point, possibly according to rules or conditions that were defined using the designer application, a text string may be sent to connect server 214. The text string may be sent under the control of interaction decision engine 232. Interaction decision engine 232 may implement rule based logic during the capture of interaction data to determine when to send text for narration. The text string may be generated in response to a call-out from the real time client. The text string may be derived from a form 243 completed by an agent at agent desktop 240 during an interaction with a customer.

Connect server 214 according to this embodiment of the invention may be responsible for transmitting requests from the real time client at agent desktop 240 to real time server 231 and vice versa. For example, connect server 214 may send a request to real time server 231 which may in turn connect to or communicate with TTS server 220 and send the text to be converted to speech.

TTS server 220 may be responsible for text to speech conversion. Requests for conversion may be sent to TTS server 220 from real time server 231 and in response to a request TTS server 220 may send speech data, for example in the form of an audio file, back to real time server 231. The conversion of text to speech may be achieved in a number of ways as will be known to those skilled in the art. TTS server 220 may for example provide an API 221 by which it may be approached. The real time client at agent desktop 240 may capture the text for narration. According to embodiments of the invention this may be done in successive capture operations, each in response to an event, for example at agent desktop 240. Events that may trigger the capture of data, for example as defined by rules determined e.g. by the designer, include but are not limited to key presses including soft key presses, and entry of one or more key words or phrases. Captured data may be converted into text or captured data may itself comprise text. For example, according to embodiments of the invention, the captured data may be used to complete a form or template comprising text which when complete may be converted into speech. The form or other text may comprise a continuous text summarizing the agreement which may then be used to generate a continuous audio summary of the agreement, e.g. in the form of speech, for example using TTS server 220 and requested via TTS server API 221. According to embodiments of the invention, the text is collected automatically, for example from various screen elements such as via a User Interface (UI) or one or more backend systems. The text that is to be sent for narration may be compiled in real time and thus can be regarded as being created dynamically. For example, whilst some predetermined strings of text may be used in the compilation, one or more parameters relating to an agreement may change between one agreement and the next. A non-limiting example of dynamic text is "account balance" which is not likely to be the same from one narrated text to another. Thus text for narration according to embodiments of the invention may comprise at least some dynamic text, which is unique to that particular narration or unique to one of the parties to the agreement.

After converting the text to speech, TTS server 220 may then start streaming the narration, for example in the form of data packets, to the real time server 231 which may then stream the narration to conferencing server 160. Conferencing server 160 may act as an "invisible" third participant in a conference call including the agent and the customer, during which the narration may be played by the customer device, e.g. telephone, 108 via PBX and the agent's IP phone 242.

Conferencing server 160 provides a bridge to the telephony systems responsible for providing audio directly to PBX 152 to the relevant agent phone 242. Real time server 231 may send the packets to conferencing server 160 with the agent details, for example, extension identification and/or IP address. Conferencing server 160 may then stream the audio packets to the PBX to the relevant agent IP phone 242 and customer device 108. Thus the narrated text received by real time server 231 is sent from the real time client via conferencing server 160 which penetrates the call between agent phone 242 and customer device 108.

Customer confirmation may be captured in a number of ways and forms, for example through speech recognition or recognizing key presses through dual tone multi-frequency "DTMF" dialing tones. Customer confirmation may be captured at agent phone 242 and may be reported back to interactions center 211 where it may be stored, for example in association with the interaction, for example as metadata attached to the interaction, agreement or transaction.

Figure 3:
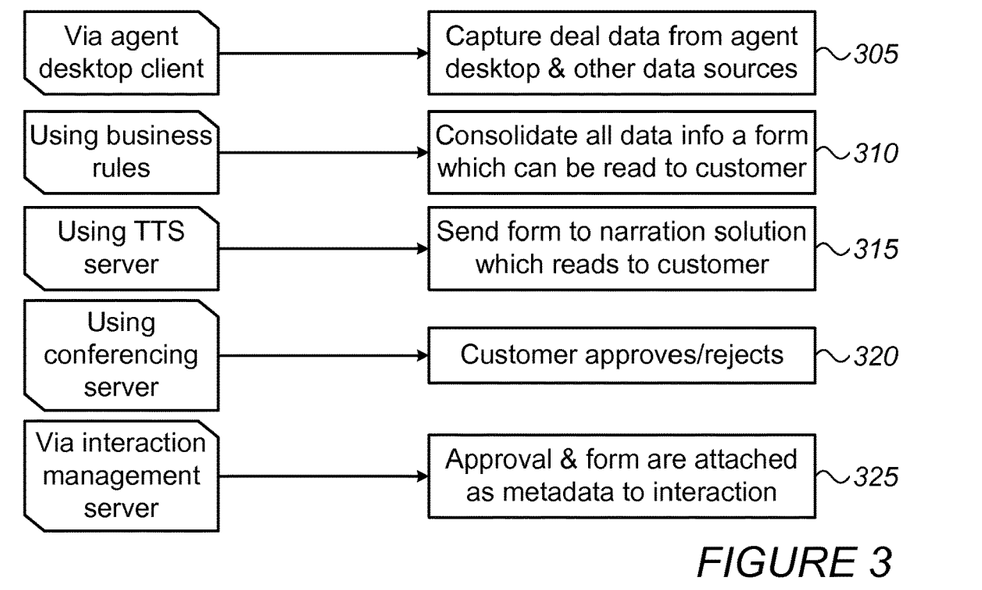
FIG. 3 is a flow chart showing a series of operations that may be used in methods according to some embodiments of the invention.
Figure 4:
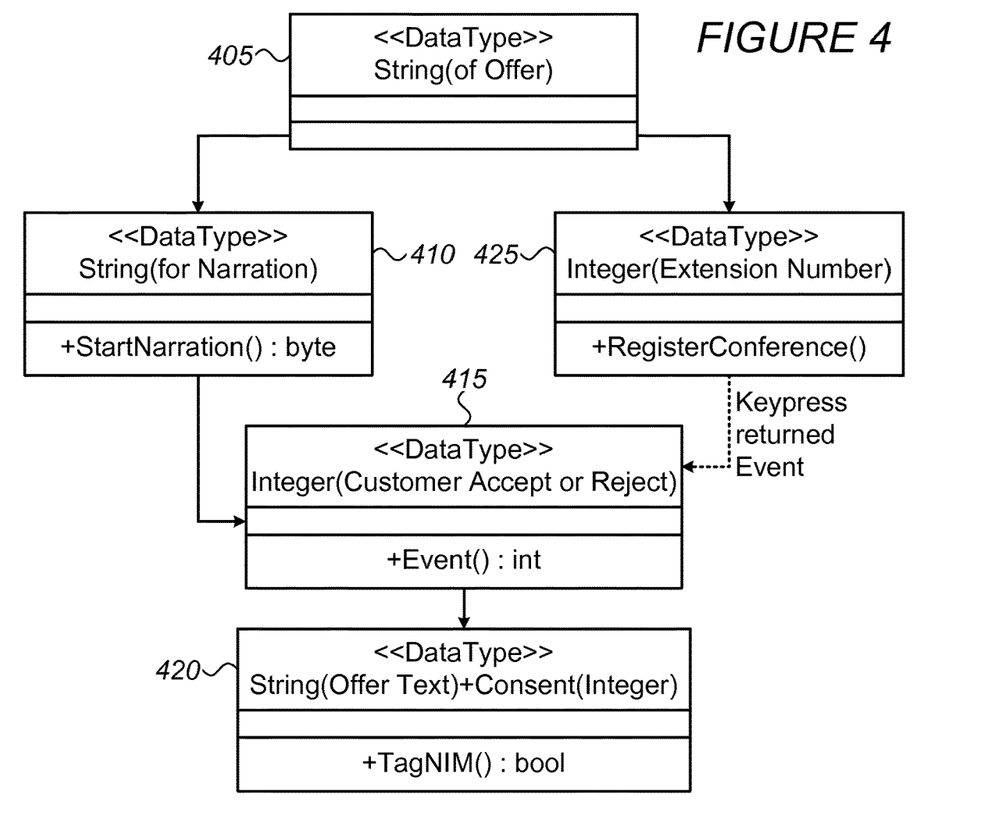
FIG. 4 shows examples of data structures that may be used in the implementation of embodiments of the invention.

Methods according to some embodiments of the invention may be described in general terms as a series of operations as illustrated in FIG. 3 using data structures as illustrated in FIG. 4.

In operation 305, a processor (e.g., executing a client on agent desktop 240) may capture interaction information, for example, according to predefined rules defined by an automation solution for the business customer developed by a designer. The interaction information may be captured from one or more data sources including but not limited to screen elements, databases, web services, IVR systems, etc. For example, prior to a voice interaction between the agent and the customer, information may have been captured during a web session by the customer using customer computer 102. According to embodiments of the invention this data or information may be captured as a plain string of bits or text.

In operation 310, the processor may consolidate the captured information, for example using rules which were previously configured by the designer, and may present a call-out or pop-up to the agent showing the information to the agent, for example on screen, in an organized manner. As shown in FIG. 4 the data or information may comprise the text of an offer made or presented to a customer as indicated as item 405 in FIG. 4, integrated with additional captured information such as agent entered data to form a string for narration indicated at 410.

In operation 310, the processor may send the text (string) for narration via an API to TTS server 220. TTS server 220 may narrate the text and send voice bytes, for example in an audio file (e.g., as shown in FIG. 4 item 410), back to the agent desktop (e.g. identified by extension number item 425 in FIG. 4). The agent's extension number enables the conferencing server 160 to identify the destination where the narration should be streamed. According to embodiments of the invention operation 310 may take place while a call between the agent and customer is in progress and therefore the conferencing server may directly extract the contact information of the customer from the call information and may not need to request the information. The audio may be streamed in parallel with the visual presentation of the information to the agent, e.g. on the agent desktop screen. The voice bytes, for example contained in an audio file, are reproduced so that both customer and agent can hear the narration, e.g. audio summary of the agreement, e.g. deal or transaction.

In operation 320, after the complete summary has been played to the customer and agent, the processor may receive an approval or rejection, also referred to as "confirmation" of the agreement by the customer. FIG. 4 shows at 415 that the confirmation may be captured or represented in the form of an integer value. The confirmation may be for example executed by the customer pressing a defined number on his phone keypad. The capturing of the customer confirmation may be achieved via integration of the conference server 160 with the customer telephony vendor and may enable the capturing of keypad presses on the customer and agent side by the conferencing server 160. An event including for example key press information may then be sent to and received by the client at the agent desktop, for example so that the agent can complete the interaction. Additionally or alternatively, conferencing server 160 may be equipped with voice recognition software so as to be able to capture verbal confirmation (or denial) by the customer. The acceptance or rejection of the offer may be displayed on the agent desktop screen.

In operation 325, the processor may then attach or associate the textual offer/disclosure data and the consent/rejection data as a textual business data field to the call recording residing at a recording system at the interaction management server 210 for easy tracking and playback, a possible data structure of which is shown at 420 in FIG. 4.

Figure 5:
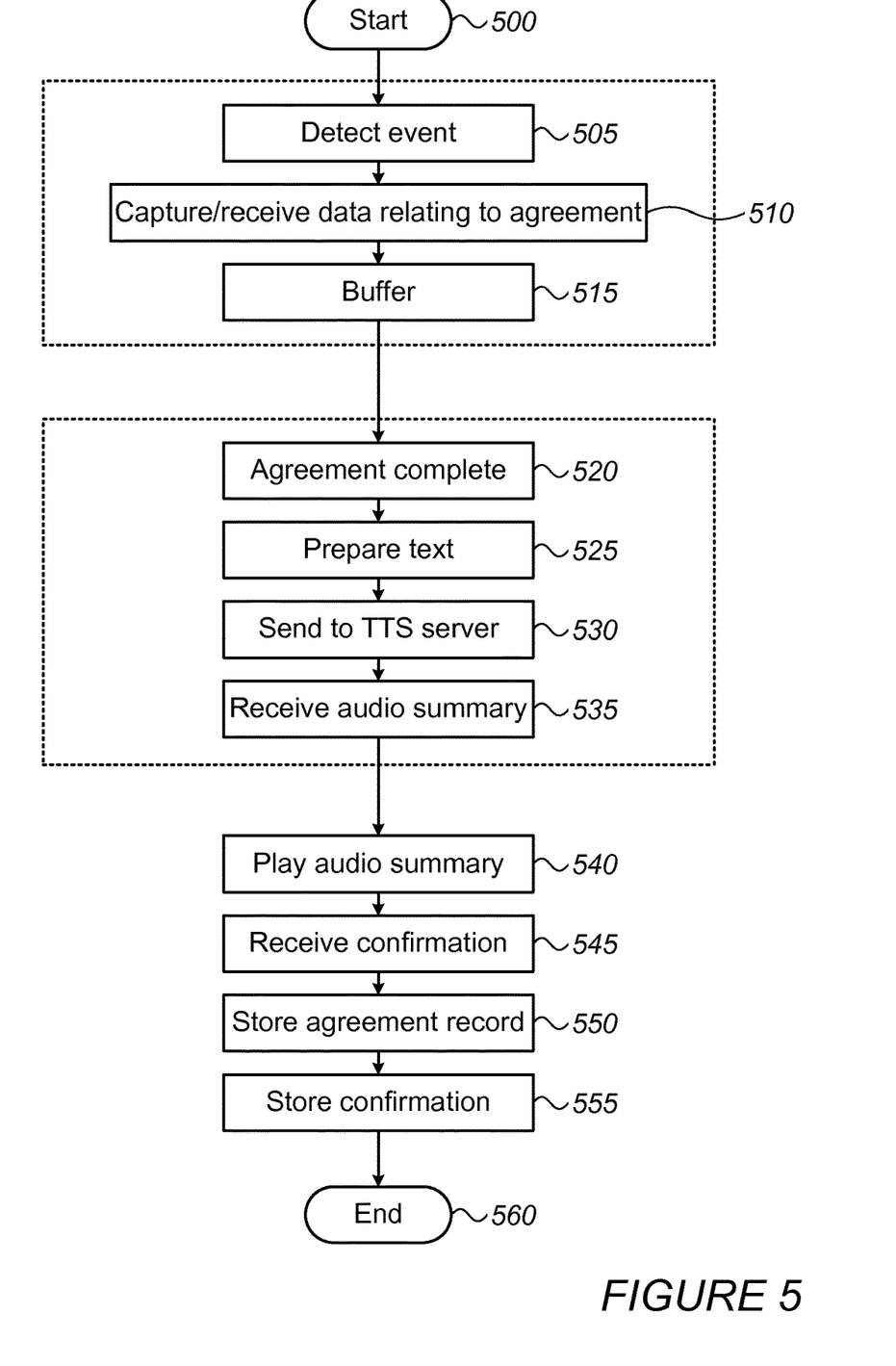
FIG. 5 is a flow chart showing a series of operations that may be used in methods according to some embodiments of the invention.

Methods according to embodiments of the invention will now be described in more detail with reference to the flowchart shown in FIG. 5.

After start-up at operation 500, and during an interaction between an agent and a customer, for example in a telephone conversation using a desktop client application, in operation 505, a processor (e.g., executing a client on agent desktop 240) may detect a first interaction event. Supposing for example that the agent is completing a form such as form 243 relating to an agreement, the event may be a simple key press or the entry of text by the agent into a field in the form. The form itself may not be presented to the agent and instead the agent may be presented with a list of questions to be answered by the customer.

Following the detection of the event in operation 505, or in response to the detection of this event, in operation 510, the processor may receive or capture data relating to the agreement.

In operation 515, the processor may store or buffer, possibly temporarily, an indication of the detected event and/or captured agreement data, for example, at agent computer in memory similar to memory 104. The stored data may relate to part of an agreement, for example one of its terms.

Operations 505, 510, and 515 may be repeated until the agreement is complete, for example as determined by business rules, for example as determined by the designer. Thus systems and methods according to embodiments of the invention may comprise multiple store operations, for example prior to generation of text for conversion or narration. Each event detected in operation 505 may relate to a parameter of an agreement, e.g. an interest rate. Data captured or received in operation 510 may comprise text for example but not limited to text input by an agent and/or predefined text selected either automatically or by the agent e.g. following a customer response. If the agent enters a key press, the captured data may comprise or be related to an answer to a question that prompted the key press. For example, a key press may be a selection of a parameter such as term of a loan, and data captured in response to the key press may comprise the term, e.g. ten years, in text form. Other forms of data that may be captured or received in response to a screen event are possible according to embodiments of the invention.

In operation 520, the processor may determine or may receive an indication that the agreement is complete, for example, when a confirmation of terms of the agreement is received from the customer. The processor may determine that the agreement is complete automatically according to predefined rules, for example business rules as discussed herein, or the determination may be made manually by an agent.

In response to an indication that the agreement is complete, in operation 525, the processor may prepare a continuous text summary or narration of the agreement. The processor may prepare the text for example by retrieving and collating events and/or captured data and/or text from the buffer.

In operation 530, the processor may send the prepared text to TTS server 220 via interaction management server 210 and real time server 231 for conversion into an audio summary of the agreement, for example by conversion of text to speech.

In operation 535, the audio summary may be received by the connect server 214.

Operations 520, 525, 530 and 535 may cause the processor to, using multiple event data, generate a continuous audio summary of an agreement generated during an interaction. The audio summary may be derived from the text generated in operation 525, according to the described embodiments, by the TTS server 220. This text may be generated in response to a single prompt signal, such as a signal generated in response to single key press by the agent. In other words only one prompt signal may be required to generate an audio summary of multiple events, such as agent screen events.

The data captured in operation 510 may comprise text to form part of the audio summary and the generation of the audio summary may include retrieving text identified by said data, such as a sentence corresponding to a question just answered by the customer.

In operation 540, the audio summary may then be played or reproduced audibly for example through speakers, headphones or telephone, to be heard by the agent and/or customer. It should be noted here that TTS server 220 may have the capability to use a variety of voices so that an appropriate one may be chosen for the customer and this may be part of the design of a method or system according to some embodiments of the invention. Thus the allocation of voice(s) to customer(s) may be determined by the designer. For example, during the development of a workflow for implementing embodiments of the invention, it is possible to capture customer properties, e.g. from an agent's screen, such as but not limited to age, gender and language. A decision can be made for example by a decision engine at real time server 231, for example based on rules which may have been devised or otherwise generated by the designer, as to the kind of narration to be requested from the TTS sever 220. Thus a request for narration may specify one or more parameters of the narration such as but not limited to voice type, e.g. male/female, old/young, regional accent and pace. The allocation may be defined according to a customer profile. For example, it is possible according to embodiments of the invention, to create multiple narrations with different voices and accents, spoken by voice actors of different ages or genders, or in different languages. These might be used for example to help the customer to feel more comfortable. One non-limiting example may be to have the same gender used for the narration as the agent's voice to avoid confusing the customer. According to embodiments of the invention, rather than multiple narrations being created for a single agreement, the request for narration sent to TTS server 220 may indicate any of gender, accent, language, or other parameter of the requested narration.

Customer profiles and other customer information may be held at interaction management server 210 or at a backend server such as web server 122.

Either the customer or the agent may be able to pause and replay any part of the audio summary. This may be achieved in any way familiar to those skilled in the art. For example, the agent may have a visual indication at desktop 240 of the entire agreement summary text, for example, within a callout or a dialog box, an indication of the current word that is spoken to the customer (e.g., by highlighting or a tracking ball following the word being read in real time), and control buttons e.g. within the same dialog. The customer may for example be able to press on his device keypad in order to pause/restart/rewind/stop the playback or to tell the agent to stop the playback. In some embodiments, when the agreement summary includes some required text (e.g., legally required sections) and other non-required text (e.g., optional or supplemental sections), the playback device may allow the customer to skip or fast-forward through the reading of the non-required text, but may not allow the customer to skip or fast-forward through the reading of the required text.

In response to the playback, in operation 545, the processor may receive confirmation from the customer.

In operation 550, the processor may store a record of the agreement or transaction, the agreement summary, and/or the corresponding interaction.

In operation 555, the processor may store the agreement confirmation, for example, as metadata to the agreement or transaction or the interaction.

Figure 6:
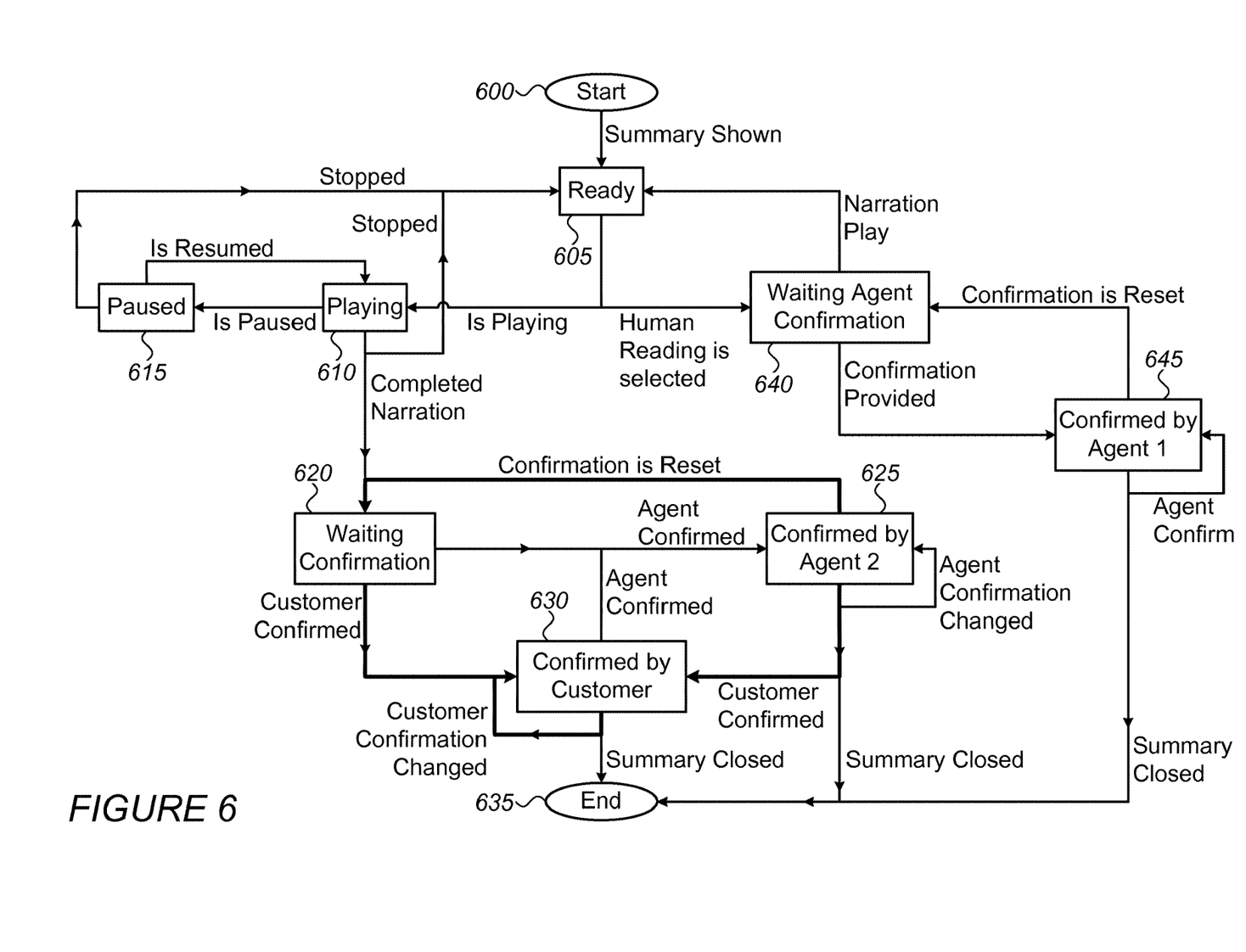
FIG. 6 is a state diagram illustrating systems and methods according to embodiments of the invention.
Figure 7:
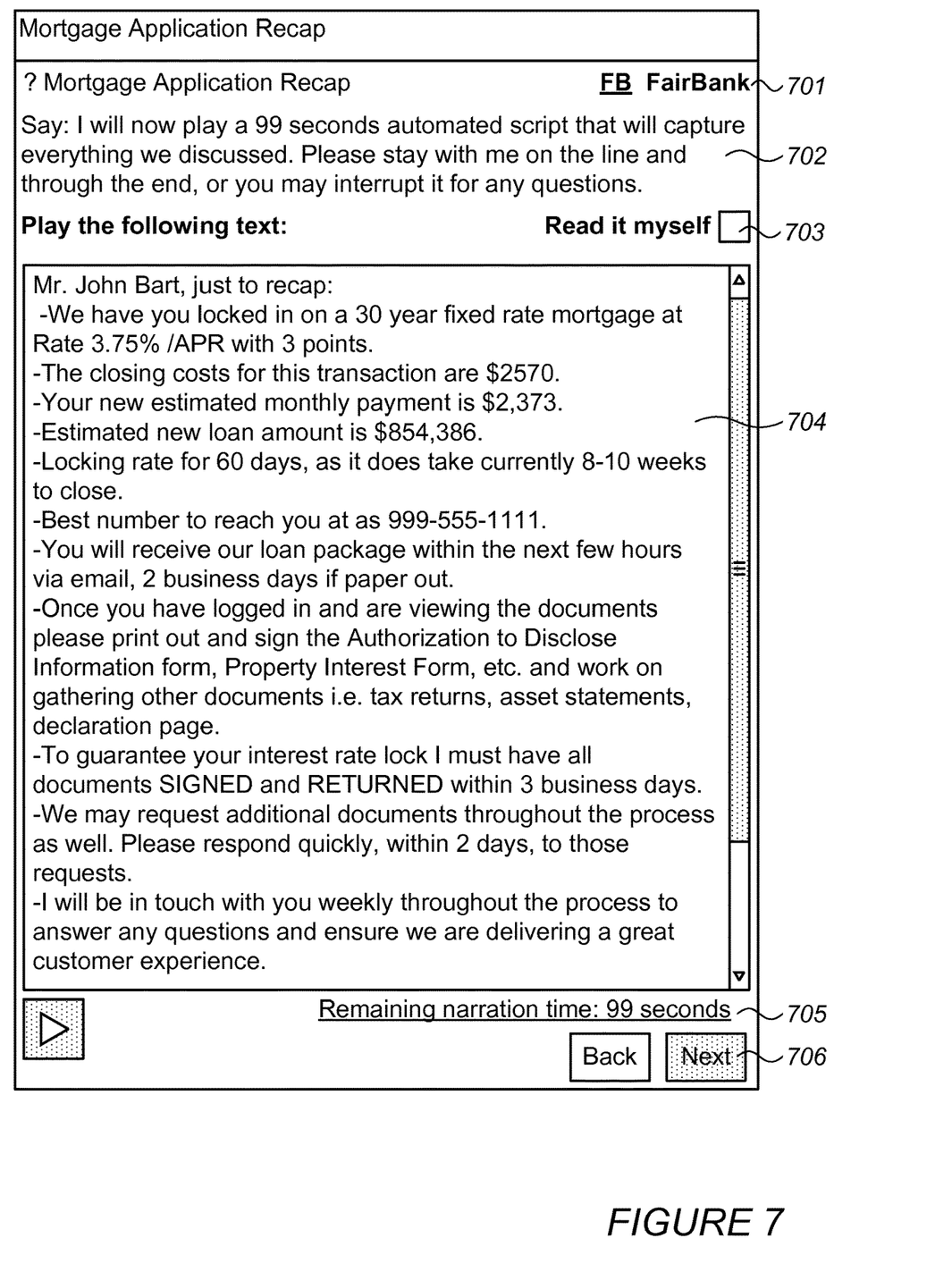
FIGS. 7, 8 and 9 are example screen shots that may be presented to an agent according to embodiments of the invention.
Figure 8:
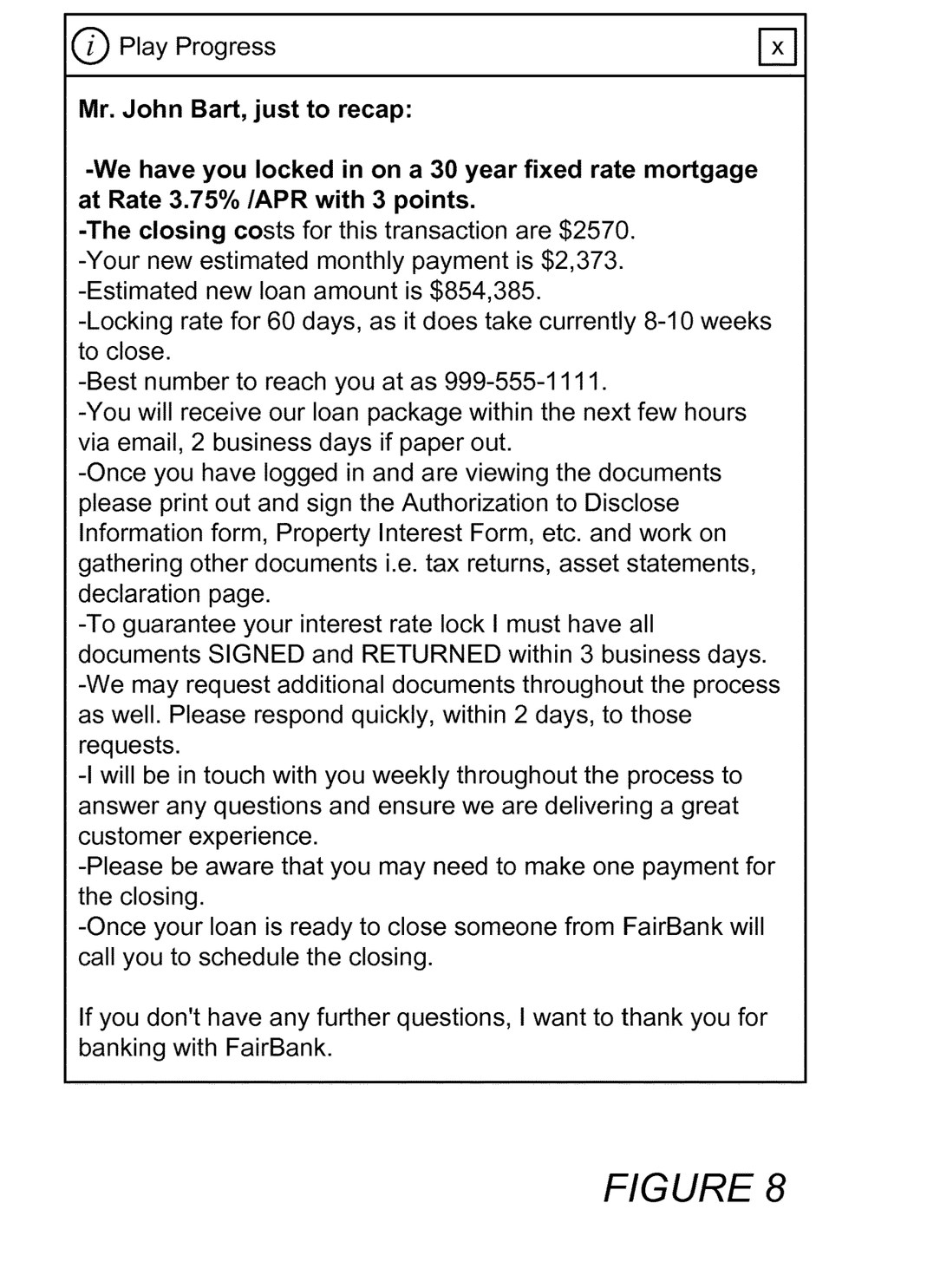
Figure 9:
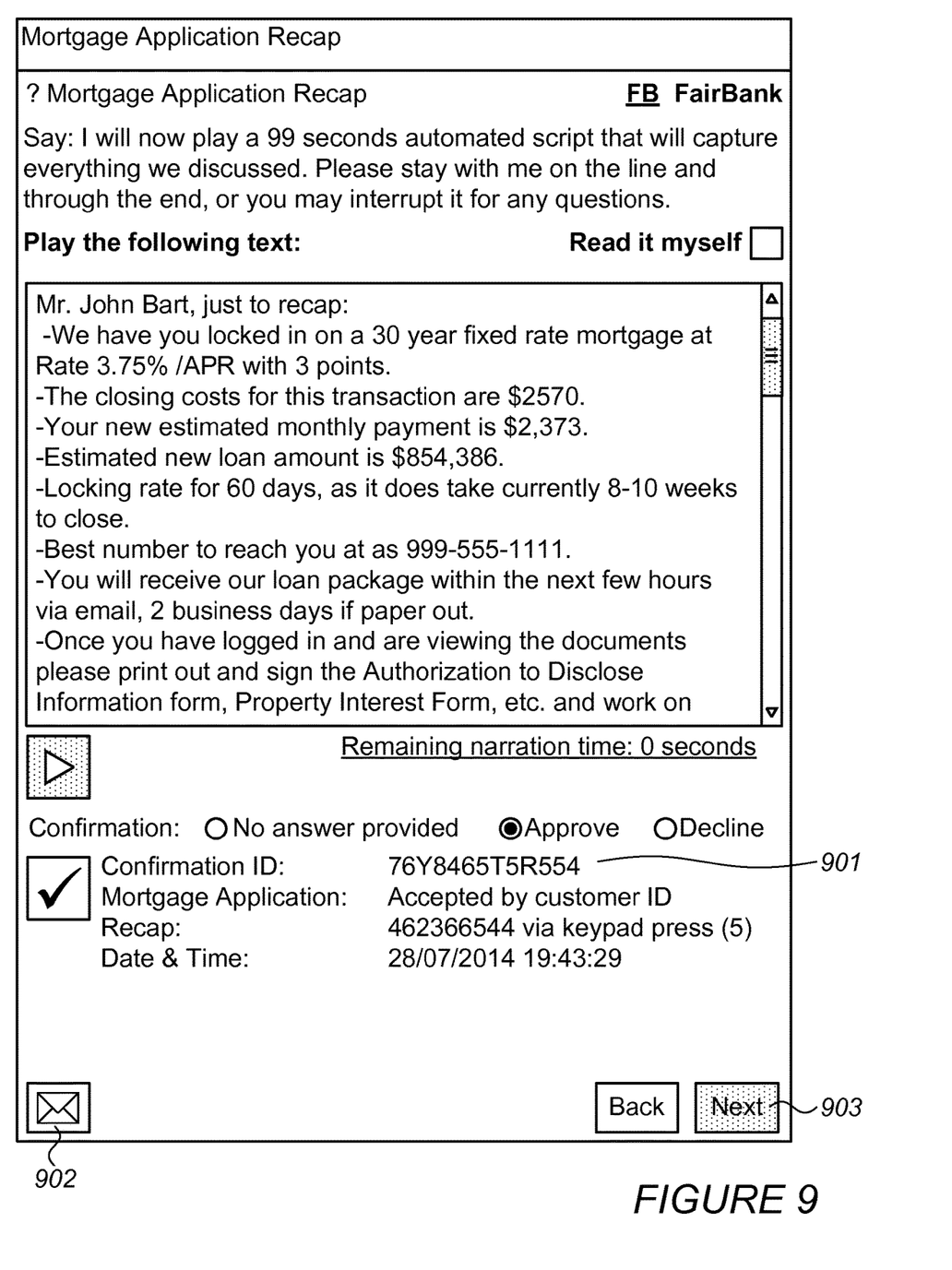

Systems and methods according to embodiments of the invention may be described in terms of a state machine schematically illustrated as a state diagram in FIG. 6 and further illustrated by examples of graphical user interface (GUI) screen shots shown in FIGS. 7, 8 and 9.

Referring to FIG. 6, after the start at operation 600, a narrated summary callout is presented, for example, in the form of a screen pop-up, an example of which is shown in FIG. 7. The state machine then enters a "Ready" state as indicated at operation 605. From this point on, the agent may play an automatically generated narration of the agreement summary or indicate he/she would like to read out the summary verbally. This latter facility may be provided as a backup in case of any problem with the automatically generated audio summary.

When playing, the machine enters playing state 610 and the agent may do any of:

pause the playing, in which case the machine enters paused state 615, wait for the customer's keypad confirmation, optionally at the same time as the machine is in the paused state, as indicated at 620, or indicate the customer's verbal confirmation in which case the machine enters "confirmed by agent 2" state 625.

Either way, after the customer has confirmed, the machine enters the "confirmed by customer" state 630 following which the process ends at 635.

When reading out verbally, the agent may indicate a customer's verbal confirmation, in which case the machine is in "waiting agent confirmation" state 640 until the agent confirms and the machine enters "confirmed by agent 1" state 645, following which the process ends at operation 635.

Referring now to FIG. 7, a GUI according to embodiments of the invention may include any of: the narrated summary topic at 701, text 702 to be read by the agent to prepare the customer for the automated audio summary, option 703 for the agent to read the text, for example in the event of any problem with the audio summary, the summary text 704 itself as it is about to be presented audibly to the customer, a countdown 705 indicating the remaining play time, and a "Next" button 706. Selection of the Next button may lead to the GUI shown in FIG. 8.

FIG. 8 shows that the text may be animated to indicate the play progress, for example by highlighting the words that have been read out so far or as shown in FIG. 8 by rendering words that have been read in bold text. At the end of the readout, the GUI shown in FIG. 9 may be presented. The GUI in FIG. 9 includes a confirmation ID 901 which may be generated in response to a key press by a customer, option for e-mail message generation 902 which may be selected by the agent, and a "Next" button 903.

When the agent clicks on "Next" 903 on the summary callout as shown in FIG. 9 the callout will close.

A processor (e.g., a processor in agent computer 120, may tag and populate confirmation details which may then be stored in a database, for example a customer relationship management "CRM" database or/and in an interaction management recording system which may comprise database 212. The "tagging" may be part of the design and may define searchable or queryable fields of stored information such as interaction data. A CRM or other database for example including customer information may be provided by a backend system, e.g. server, which may be separate from the interaction management center 124. For example, web server 122 may comprise a backend server hosting one or more data sources from which data may be captured and used to create text for narration. Such a backend system may be updated with data, from the real time server 231 for example, either by directly writing to a backend database or via a web service.

Figure 10:
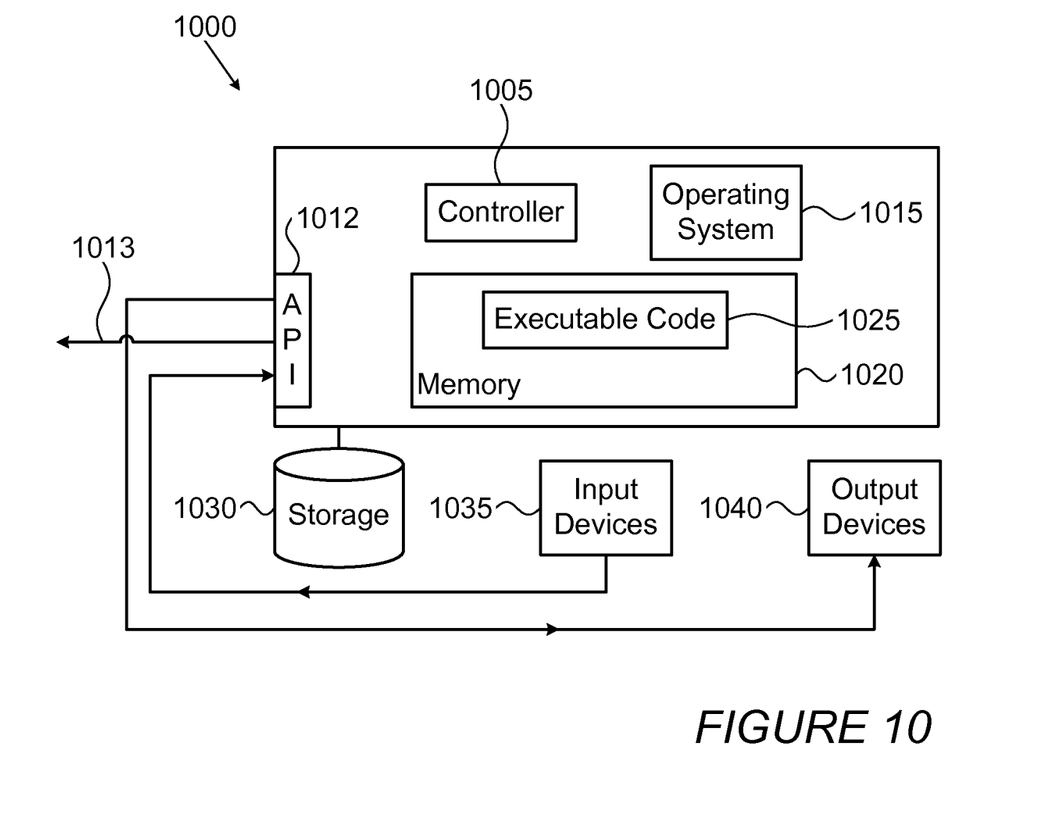
FIG. 10 is a high level block diagram of an example computing system 1000 according to embodiments of the present invention.

Reference is made to FIG. 10 showing a high level block diagram of an example computing system 1000 according to embodiments of the present invention, for example for use in systems according to embodiments of the invention. For example, any of the servers shown in FIGS. 1 and 2, agent, customer and designer computers or other computing devices carrying out all or part of embodiments of the present invention may include components such as those included in computing system 1000. Computing system 1000 may comprise a single computing device or components and functions of system 1000 may be distributed across multiple computing devices. Computing system 1000 may include one or more controllers such as controller 1005 that may be, for example, a central processing unit processor (CPU), a chip or any suitable processor or computing or computational device, an operating system 1015, a memory 1020, a storage 1030, input devices 1035 and an output devices 1040.

One or more processors in one or more controllers such as controller 1005 may be configured to carry out methods according to embodiments of the invention. For example, one or more processors within controller 1005 may be connected to memory 1020 storing software or instructions that when executed by the one or more processors cause the one or more processors to carry out a method according to embodiments of the present invention. Controller 1005 or a central processing unit within controller 1005 may be configured, for example using instructions stored in memory 1020, to perform the capturing of agent screen data and the generation of the text for narration. The same or a different controller may perform the text to speech conversion in a similar manner. The platforms 1002 and 1003 of FIG. 10 may be implemented as executable code stored in memory 1020 to be executed by one or more processors, for example in controller 1005.

Operating system 1015 may be or may include any code segment designed and/or configured to perform tasks involving coordination, scheduling, arbitration, supervising, controlling or otherwise managing operation of computing system 1000, for example, scheduling execution of programs. Operating system 1015 may be a commercial operating system. Memory 1020 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In one embodiment, memory 1020 is a non-transitory processor-readable storage medium that stores instructions and the instructions are executed by controller 1005. Memory 1020 may be or may include a plurality of, possibly different memory units.

Executable code 1025 may be any executable code, e.g., an application, a program, a process, task or script. Executable code 1025 may be executed by controller 1005 possibly under control of operating system 1015.

Storage 1030 may be or may include one or more storage components, for example, a hard disk drive, a Compact Disk (CD) drive, a CD-Recordable (CD-R) drive, a universal serial bus (USB) device or other suitable removable and/or fixed storage unit. For example, memory 1020 may be a non-volatile memory having the storage capacity of storage 1030. Accordingly, although shown as a separate component, storage 1030 may be embedded or included in memory 1020. Storage 1030 or memory 1020 may store interaction records, audio files containing the audio summaries, and associated metadata including confirmation metadata as described herein.

Input to and output from a computing system according to embodiments of the invention may be via an API, such as API 1012 shown in FIG. 10. The API 1012 shown in FIG. 10 operates under the control of the controller 1005 executing instructions stored in memory 1020. Input to and output from the system via the API may be via input/output port 1013. Input may comprise for example requests for text to speech conversion in the case of TTS server 220. Output may comprise the text converted into speech.

Servers used in embodiments of the invention may include user input devices. Input devices 1035 may be or may include a mouse, a keyboard, a touch screen or pad or any suitable input device. It will be recognized that any suitable number of input devices may be operatively connected to computing system 1000 as shown by block 1035.

Servers used in embodiments of the invention may include one or more output devices. Output devices 1040 may include one or more displays, speakers and/or any other suitable output devices. It will be recognized that any suitable number of output devices may be operatively connected to computing system 1000 as shown by block 1040. Any applicable input/output (I/O) devices may be connected to computing system 1000 as shown by blocks 1035 and 1040. For example, a wired or wireless network interface card (NIC), a modem, printer or a universal serial bus (USB) device or external hard drive may be included in input devices 1035 and/or output devices 1040.

Input devices 1035 and output devices 1040 are shown as providing input to the system 1000 via the API 1012 for the purpose of embodiments of the invention. For the performance of other functions carried out by system 1000, input devices 1035 and output devices 1040 may provide input to or receive output from other parts of the system 1000.

Alternatively all output from a server according to embodiments of the invention may be to a remote device such as another server in which case the output devices may be replaced by a data port.

Embodiments of the invention may include computer readable medium or an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, embodiments of the invention may comprise a storage medium such as memory 1020, computer-executable instructions such as executable code 1025 and a controller such as controller 1005.

A system according to embodiments of the invention may include components such as, but not limited to, a plurality of central processing units (CPU), e.g., similar to controller 1105, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computer system for automatically generating and playing an audio file of an agreement between two or more parties, the system comprising one or more processors configured to:
   capture data via a real time client running on a computer that monitors an interaction between the two or more parties, the captured data relating to the agreement in successive capture operations, each capture operation executed in response to a detected event, wherein the real time client captures data from video display screen elements of one party of the two or more parties facing the application of the computer, one or more webservices of the computer, or any combination thereof and wherein the captured data comprises at least one piece of information that is specific to at least one of the parties;
   insert, via the real time client, the captured data into a template, wherein the template comprises text;
   use the template with the inserted captured data to prepare a continuous text of the agreement;
   transmit, from the real time client operating on the computer, the continuous text of the agreement via an API to a TTS server;
   generate, via the TTS server, an audio file from the continuous text;
   transmit the audio file from the TTS server, via the API to the real time client operating on the computer;
   presenting a screen pop-up to the display of the computer, wherein the screen pop-up includes an indication to play the audio file;
   upon receipt of the indication to play the audio file, play to at least one of the parties the audio file, wherein the audio file represents the agreement as indicated by the template with the inserted captured data; and
   receiving a keypad confirmation of the audio file being played and the one party of the two or more parties accepting the terms of the agreement.

2. A system as claimed in claim 1 further comprising one or more data stores providing buffer storage, wherein the one or more processors are further configured to:
   buffer the data in multiple store operations, one for each event;
   receive a signal indicating that the agreement is complete; and
   prepare the continuous text in response to said signal.

3. A system as claimed in claim 1 further comprising a display screen, wherein capturing data relating to the agreement comprises capturing screen data relating to each detected event.

4. A system as claimed in claim 1 wherein the one or more processors are configured to send a request for conversion of the continuous text to a text to speech convertor and wherein the audio file comprises the continuous text converted into speech.

5. A system as claimed in claim 1 wherein the playing of the audio file comprises streaming the file to audio equipment associated with at least one of the parties.

6. A system as claimed in claim 1 wherein the one or more processors are configured to pause and resume the audio file in response to user input by at least one of the parties.

7. A system as claimed in claim 1 further comprising one or more data stores and wherein the one or more processors are further configured to receive a verification indication originating from at least one of the parties and to store the verification indication such that the indication is associated with the agreement.

8. A system as claimed in claim 7 wherein the one or more processors are configured to capture the data during an interaction between two or more parties and to store a record of the interaction and wherein the indication is stored as metadata attached to the interaction data.

9. A system as claimed in claim 8 in which the data relating to the agreement comprises any of data defining multiple events, the text and the audio file.

10. The system of claim 1 wherein the captured data is data captured from one or more databases of the computer, one or more interactive voice response systems of the computer, or any combination thereof.

* * * * *